United States Patent [19]

Takahashi

[11] Patent Number: 5,190,012

[45] Date of Patent: Mar. 2, 1993

[54] FUEL CONTROL DEVICE FOR AN INTERNAL COMBUSTION ENGINE

[75] Inventor: Toshihisa Takahashi, Himeji, Japan

[73] Assignee: Mitsubishi Denki Kabushiki Kaisha, Tokyo, Japan

[21] Appl. No.: 820,738

[22] Filed: Jan. 15, 1992

[30] Foreign Application Priority Data

Jan. 22, 1991 [JP] Japan .................................. 3-005641

[51] Int. Cl.$^5$ ............................................ F02M 51/00
[52] U.S. Cl. ................................................... 123/479
[58] Field of Search ................... 123/479, 494, 198 D, 123/480, 489; 364/431.04, 431.05, 431.11

[56] References Cited

U.S. PATENT DOCUMENTS

| | | | |
|---|---|---|---|
| 4,989,570 | 2/1991 | Kuribara et al. | 123/479 |
| 4,996,964 | 3/1991 | Ohuchi | 123/479 |
| 5,007,398 | 4/1991 | Kashiwabara | 123/479 |
| 5,048,491 | 9/1991 | Haiki | 123/479 |
| 5,119,300 | 6/1992 | Bartke et al. | 364/431.11 |

Primary Examiner—Raymond A. Nelli
Attorney, Agent, or Firm—Sughrue, Mion, Zinn, Macpeak and Seas

[57] ABSTRACT

A fuel control device for an internal combustion engine comprises an intake air flow sensor, a crank angle sensor, an intake pressure sensor, and means for calculating a predicted intake air quantity based on the engine rpm and the intake pressure. A failure of the air flow sensor is determined by comparing the predicted intake air quantity with the sensed intake air flow, and the fuel injection is controlled based on the output of the air flow sensor when it is normal and on the predicted intake air quantity when the air flow sensor has failed.

2 Claims, 9 Drawing Sheets

FUEL CONTROL DEVICE FOR AN INTERNAL COMBUSTION ENGINE

BACKGROUND OF THE INVENTION

1. Field of the Invention

This invention relates to a fuel control device for an internal combustion engine provided with an air flow quantity sensor, which detects failure in the air flow quantity sensor, supplies fuel to the engine based on a preset intake air quantity when the air flow quantity sensor fails and informs the vehicle driver of the failure.

2. Discussion of Background

An electronically controlled fuel injection device which has rapidly been installed in an automobile in recent time is a device for making a mixture supplied to a combustion chamber of the engine, which converts a revolution number or an intake air quantity or the like to electric signals, processes these signals by a microcomputer, and generates a signal signifying an optimum air fuel ratio. The device controls the air fuel ratio by controlling valve opening time of fuel injection valves which are electromagnetically driven by these signals, to thereby keep optimizing operational state of the engine.

Generally, in such an electronically controlled fuel injection device of this kind, an air flow quantity sensor is installed at an intake air passage of the engine. For instance, the device calculates an intake air quantity per intake stroke, Q/N based on an intake air flow quantity per unit time Q which is measured by the air flow quantity sensor, and a number of intake times per unit time N, and supplies the fuel quantity which is obtained from a target fuel air ratio and the intake air quantity Q/N from fuel injection valves to the engine.

Conventionally, in detecting failure such as damaged parts in the air flow quantity sensor, or incomplete wiring contact, or an erroneous operation thereof or the like, the air flow quantity per unit time and a predetermined value time are compared, and the air flow quantity sensor is determined as failed in case that a measured value of the air flow quantity is smaller than a predetermined value on the lower limit side, or in case that the measured value of the air flow quantity is larger than a predetermined value on the upper limit side.

Since the failure detection of the conventional air flow quantity sensor is performed as above, the failure determination can be performed only in case that an output of the air flow quantity sensor is extremely abnormal. Therefore, a failure to an extent wherein an output error of the air flow quantity sensor is enlarged due to deterioration of inner parts of the air flow quantity sensor or loose contact of connector portions thereof or the like, is not determined as a failure, which causes increase of injurious components in exhaust gas, knocking, and melting loss of an exhaust system of the engine due to temperature elevation of the exhaust gas.

SUMMARY OF THE INVENTION

It is an object of the present invention to provide a fuel control device for an internal combustion engine which can increase failure detection sensitivity of the air flow quantity sensor, detect swiftly and accurately the failure of the sensor, and carry on operation of the engine without lowering the function of the engine.

According to an aspect of the present invention, there is provided a fuel control device for an internal combustion engine which comprises:

an air flow quantity sensor for detecting an intake air flow quantity of the internal combustion engine;

a crank angle sensor for detecting a rotation angle of a crankshaft of the internal combustion engine;

a pressure sensor for detecting a pressure in an intake pipe of the internal combustion engine;

a means for determining or calculating an assumed or predicted intake air quantity for the internal combustion engine based on an engine revolution number obtained from an output of the crank angle sensor and the pressure in the intake pipe;

a failure detecting means of the air flow quantity sensor for detecting a failure of the air flow quantity sensor based on a result of comparing the calculated intake air quantity with the intake air flow quantity obtained from the air flow quantity sensor; and a fuel injection quantity controlling means for controlling a fuel injection quantity to the internal combustion engine based on an output of the air flow quantity sensor when the air flow quantity sensor is normal and on the calculated intake air quantity when the air flow quantity sensor is in failure.

DETAILED DESCRIPTION OF THE PREFERRED EMBODIMENTS

Figure 1:
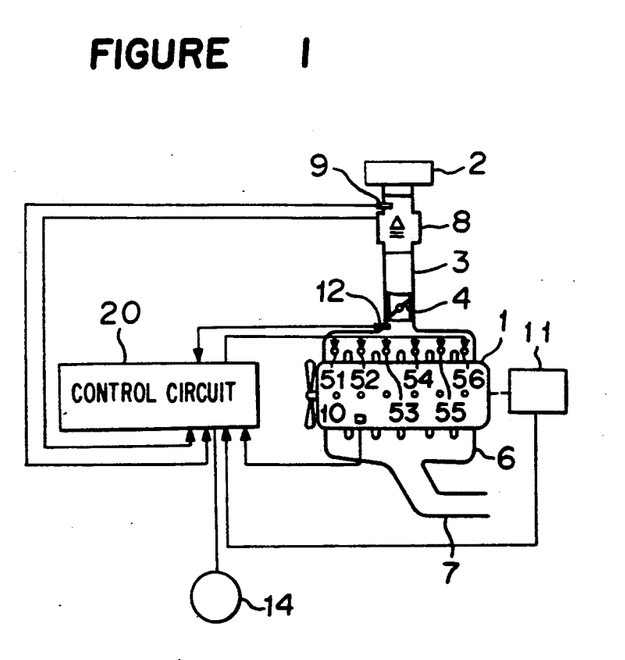
FIG. 1 is a construction diagram showing an embodiment of the invented device.

In the following, explanation will be given to embodiments of the present invention referring to the drawings. FIG. 1 shows a total structure of this embodiment, wherein a reference numeral 1 designates a four-cycle spark ignition type engine mounted on an automobile, which sucks air for combustion through an air cleaner 2, an intake pipe 3, and a throttle valve 4. Furthermore, electromagnetic type fuel injection valves 51 through 56 are opened by an output of a control circuit 20, and fuel is supplied to respective cylinders. The exhaust gas after combustion is discharged to the air through an exhaust manifold 6, an exhaust pipe 7 and the like. An air flow quantity sensor 8 is provided at an intake pipe 3, which detects an intake air quantity to the engine 1, and outputs a pulse signal having a frequency corresponding with the intake air quantity. Moreover, a thermister type intake air temperature sensor 9 is provided at the intake pipe 3, which detects temperature of the intake air, and outputs an analogue voltage corresponding with the intake air temperature. A thermister type water temperature sensor 10 is provided in the engine 1, which detects cooling water temperature of the engine, and outputs an analogue voltage (analogue detection signal) corresponding with the cooling water temperature. A crank angle sensor 11 detects a revolution speed of the crankshaft of the engine 1, and outputs a pulse signal having a frequency corresponding with the revolution speed. Furthermore, a pressure sensor 12 is provided at the intake pipe 3, which detects pressure in the intake pipe. A control circuit 20 is a circuit which calculates the fuel injection quantity based on detected signals of the air flow quantity sensor 8, the intake air temperature sensor 9, the water temperature sensor 10, the crank angle sensor 11 and the pressure sensor 12, and controls the fuel injection quantity by controlling the valve opening time of the fuel injection valves 51 through 56. A failure display lamp 14 is turned on when the air flow quantity sensor 8 is in failure, and informs an engine driver of the failure.

Figure 2:
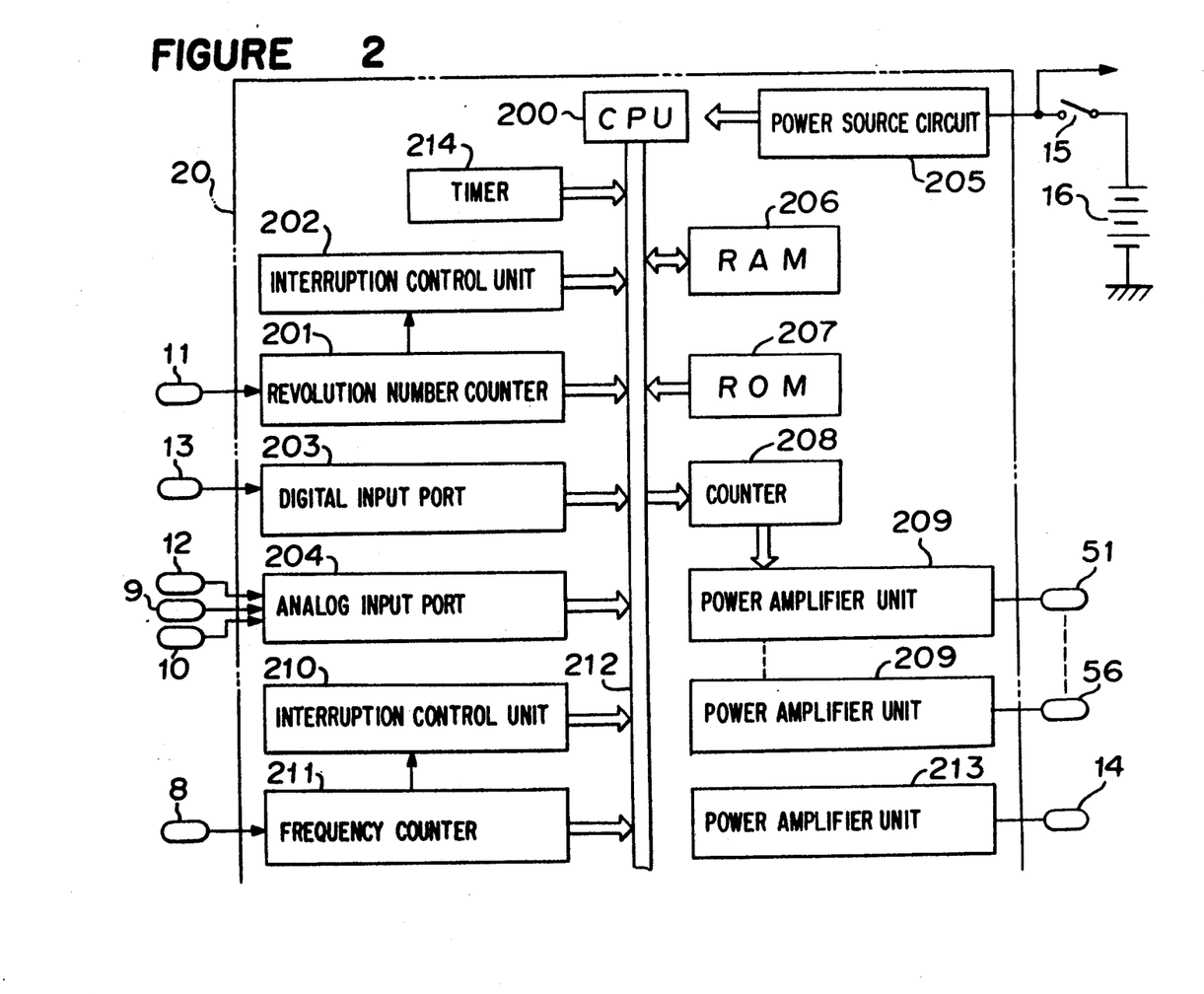
FIG. 2 is a construction diagram showing a first embodiment of a control circuit according to the present invention.

FIG. 2 shows structure of the control circuit 20, wherein a reference numeral 200 designates a microprocessor (hereinafter, CPU) which calculates the fuel injection quantity, and 201, a revolution number counter, which counts a period between predetermined crank angles by signals from the crank angle sensor 11, and transmits interruption orders to an interruption control unit 202 in synchronism with the engine revolution. When the interruption control unit 202 receives this signal, it outputs an interruption signal to CPU 200 through a common bus 212. A digital input port 203 transfers the digital signals such as a starter signal from a starter switch 13 which makes ON and OFF the operation of the starter, not shown, to CPU 200. An analogue input port 204 is composed of an analogue multiplexer and an A/D converter, which converts from analogue to digital (A/D-converts) outputs of the intake air temperature sensor 9, the water temperature sensor 10, and the pressure sensor 12, and has CPU 200 successively read them. Outputs of the revolution number counter 201, the interruption control unit 202, the digital input port 203, and the analogue input port 204 are transferred to CPU 200 through the common bus 212. A reference numeral 206 designates a RAM, and 207, a ROM which memorizes programs and various constants. A reference numeral 208 designates a counter for controlling fuel injection time having a register, which is composed of a down-counter, and which converts a digital signal showing the valve opening time of the fuel injection valves 51 through 56 calculated by CPU 200, that is, fuel injection quantity, to a pulse signal having a pulse time width for the actual valve opening time of the fuel injection valves 51 through 56. A reference numeral 209 designates power amplifier units which drive the fuel injection valves 51 through 56, and 214, a timer, which measures elapsed time and transmit it to CPU 200. The revolution number counter 201 measures the period at every predetermined crank angle of the engine 1 by an output of the crank angle sensor 11, and supplies an interruption order signal to the interruption control unit 202 at the end of the measurement.

The interruption control unit 202 generates an interruption signal corresponding to the above signal, and has CPU 200 perform an interruption treating routine for calculating the fuel injection quantity.

A reference numeral 211 designates a frequency counter, which counts an input pulse number in a predetermined term by a signal of the air flow quantity sensor 8. Furthermore, the frequency counter 211 transmits an interruption order signal to an interruption control unit 210 in synchronism with the above input pulse. When the interruption control unit 210 receives this signal, it outputs an interruption signal to CPU 200 through the common bus 212. A reference numeral 213 designates a power amplifier unit which turns on the failure display lamp 14.

Figure 3A:
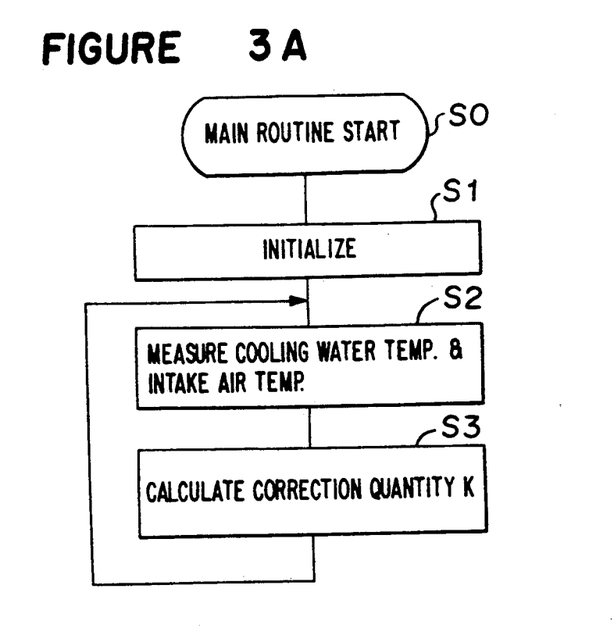
FIGS. 3A, 3B, and 3C are flow charts showing the operation of the first embodiment according to the present invention.

FIG. 3A designates an outline flow chart of CPU 200. When the key switch 15 and the starter switch 13 are ON and the engine 1 is started up, in step S0, the operation starts calculation treatment of the main routine. In step S1, the operation performs an initializing treatment. In step S2, the operation reads digital values corresponding with the intake air temperature and the cooling water temperature from the analogue input port 204. In step S3, the operation calculates fuel correction quantity K corresponding with the read in values, stores the result in RAM 204, and returns to step S2. Normally CPU 200 repeats the treatments in steps S2 and S3 following control programs.

Figure 3B:
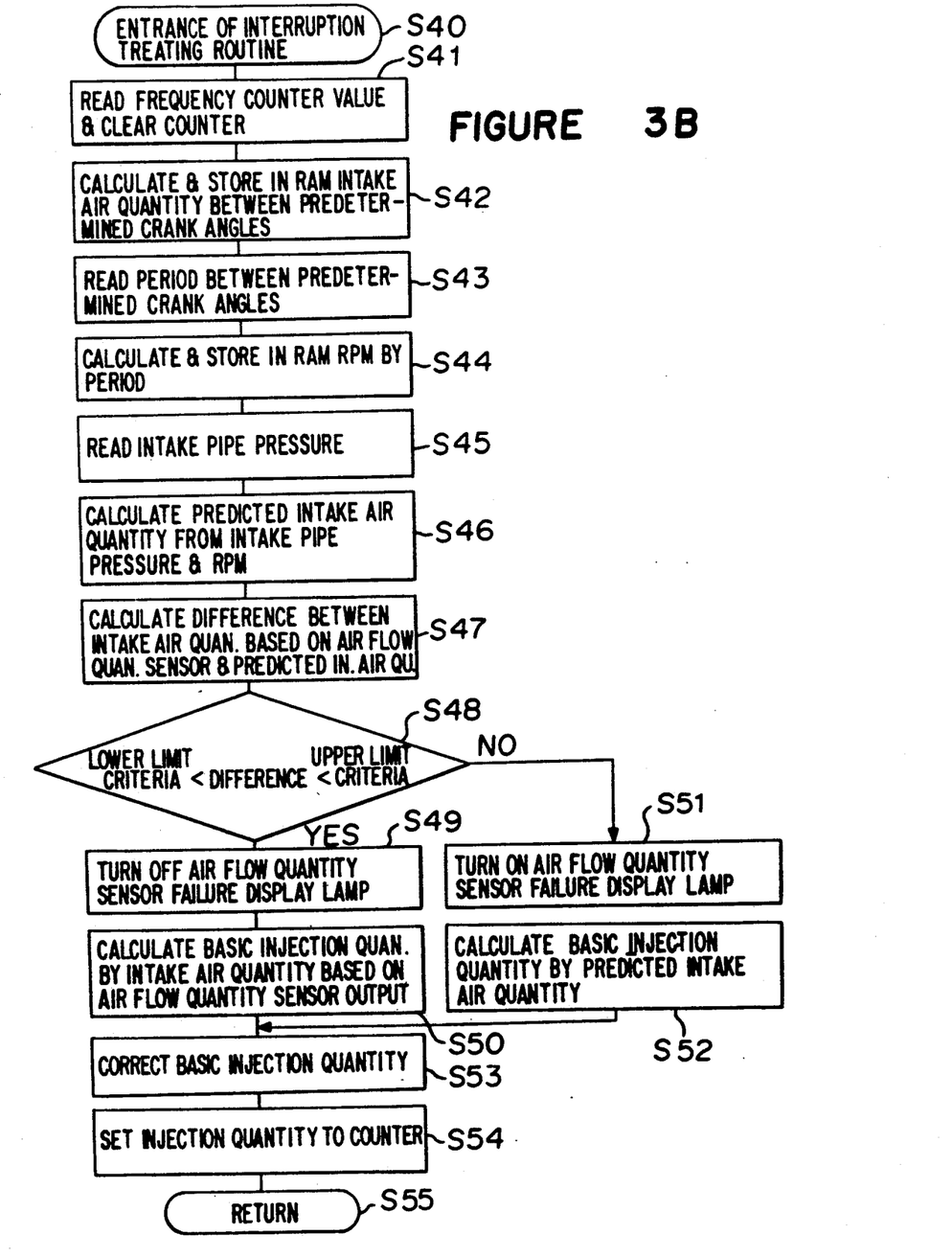

At this moment, when the interruption signal is inputted from the interruption control unit 202, CPU 200 at once discontinues its treatment even when it is treating the main routine, and performs the interruption treatment routine of step S40 shown in FIG. 3B. In step S41, the operation reads an output frequency of the air flow quantity sensor 8 which is counted by the frequency counter 211, and clears the frequency counter 211. In step S42, the operation calculates the intake air quantity between predetermined crank angles based on the frequency counter value, the pulse period, pulse input time, a pulse fraction at the preceding calculation, and the current time. Explanation will be given to the method of the calculation according to FIGS. 3C and 4.

Figure 3C:
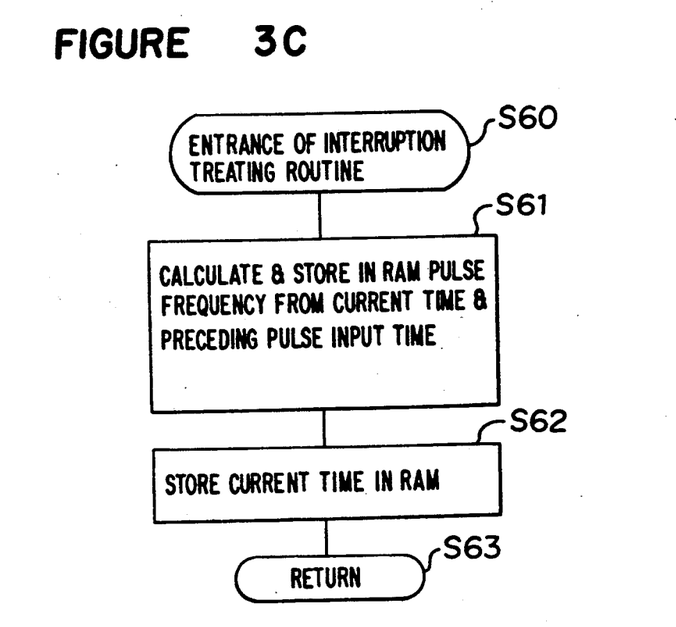
Figure 4:
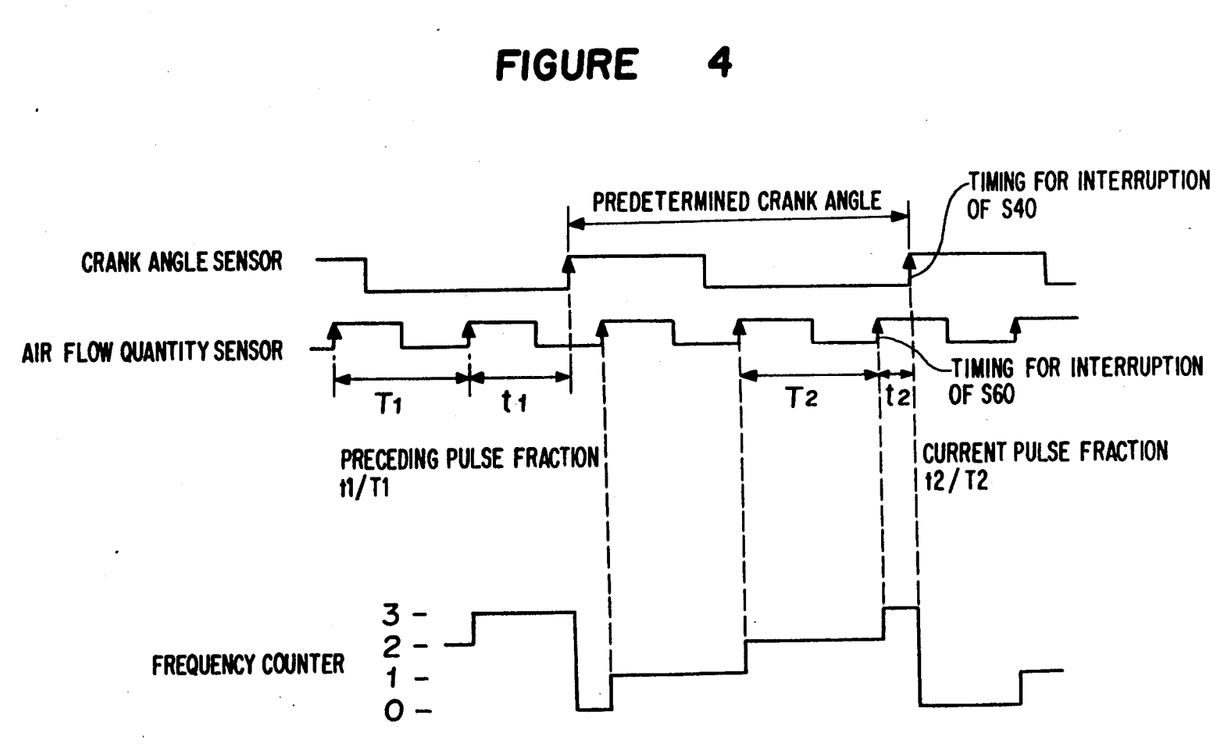
FIG. 4 are timing charts showing operation of calculating the intake air quantity according to the present invention.

As shown in FIG. 4, when the output pulse of the air flow quantity sensor 8 is inputted, the frequency counter 211 is incremented by 1, at the same time, the interruption control unit 210 generates the interruption signal, and CPU 200 performs interruption treatment shown in FIG. 3C. In step S61, the operation calculates the pulse period T based on the preceding input time of the output pulse of the air flow quantity pulse 8 and the current time. In step S62, the operation stores the pulse input time in RAM 206, for calculating the pulse period for the next time. In step S42, first of all, the operation calculates the current pulse fraction from the pulse period $T_2$ and the pulse input time calculated in steps S61 and S62 by the following equations.

Elapsed time from the pulse input $T_2$ = Current time − Pulse input time

Current pulse fraction = $t_2/T_2$

Next, the operation calculates the input pulse number N between predetermined crank angles by the following equation.

$N$ = Frequency counter value $n$ −

-continued

Preceding pulse fraction + Current pulse fraction

The operation calculates the intake air quantity between predetermined crank angles from the input pulse number N calculated as above, by the following equation utilizing the air quantity constant per 1 pulse $K_P$ (1/pulse).

$Q_s$ = Input pulse number N*Air quantity constant $K_p$

In step S43, the operation reads a period between predetermined crank angles which is read by the revolution number counter 201, and in step S44, the operation calculates the revolution number by the following equation from the period.

Revolution number = Constant/Period

The operation stores the calculated revolution number in RAM 206. In step S45, the operation reads digital information corresponding with the intake pipe pressure from the analogue input port 204, and in step S46, the operation calculates an assumed or predicted intake air quantity $Q_I$ corresponding with the revolution number and the intake pipe pressure obtained as above, from map data shown in FIG. 5. In this map data, the intake air quantity information (for instance, measured value) corresponding with the respective revolution number and the respective intake pipe pressure, is predetermined and memorized in ROM 207. In step S47, the operation calculates a difference $\Delta Q$ between the intake air quantity $Q_s$ based on the output of the air flow quantity sensor 8 which is calculated in step S42, and the predicted intake air quantity $Q_I$ by the following equation.

$\Delta Q = Q_s - Q_I$

In step S48, the operation compares $\Delta Q$ with criterion, and when lower limit criteria $< \Delta Q <$ upper limit criteria, the operation determines that the air flow quantity sensor 8 is normal, and goes to step S49. When $\Delta Q \leq$ lower limit criteria, or upper limit criteria $\leq \Delta Q$, the operation determines that the output error of the air flow quantity sensor 8 is enlarged due to deterioration of elements in the air flow quantity sensor 8 or to snapping of wire, and goes to step S51. In step S49, the operation turns off the failure display lamp 14 of the air flow quantity sensor 8, and in step S50, calculates basic injection quantity $T_B$ corresponding with the intake air quantity $Q_s$ based on the output of the air flow quantity sensor 8 by the following equation.

Basic injection quantity $T_B$ = Intake air quantity $Q_s$*Constant

On the other hand, in step S51, the operation turns on the failure display lamp 14, and informs the engine driver of the failure. In step S52, the operation calculates the basic injection quantity Ts corresponding with the predicted intake air quantity $Q_I$ by the following equation.

Basic injection quantity $T_B$ = Predicted intake air quantity $Q_I$*Constant

Figure 6:
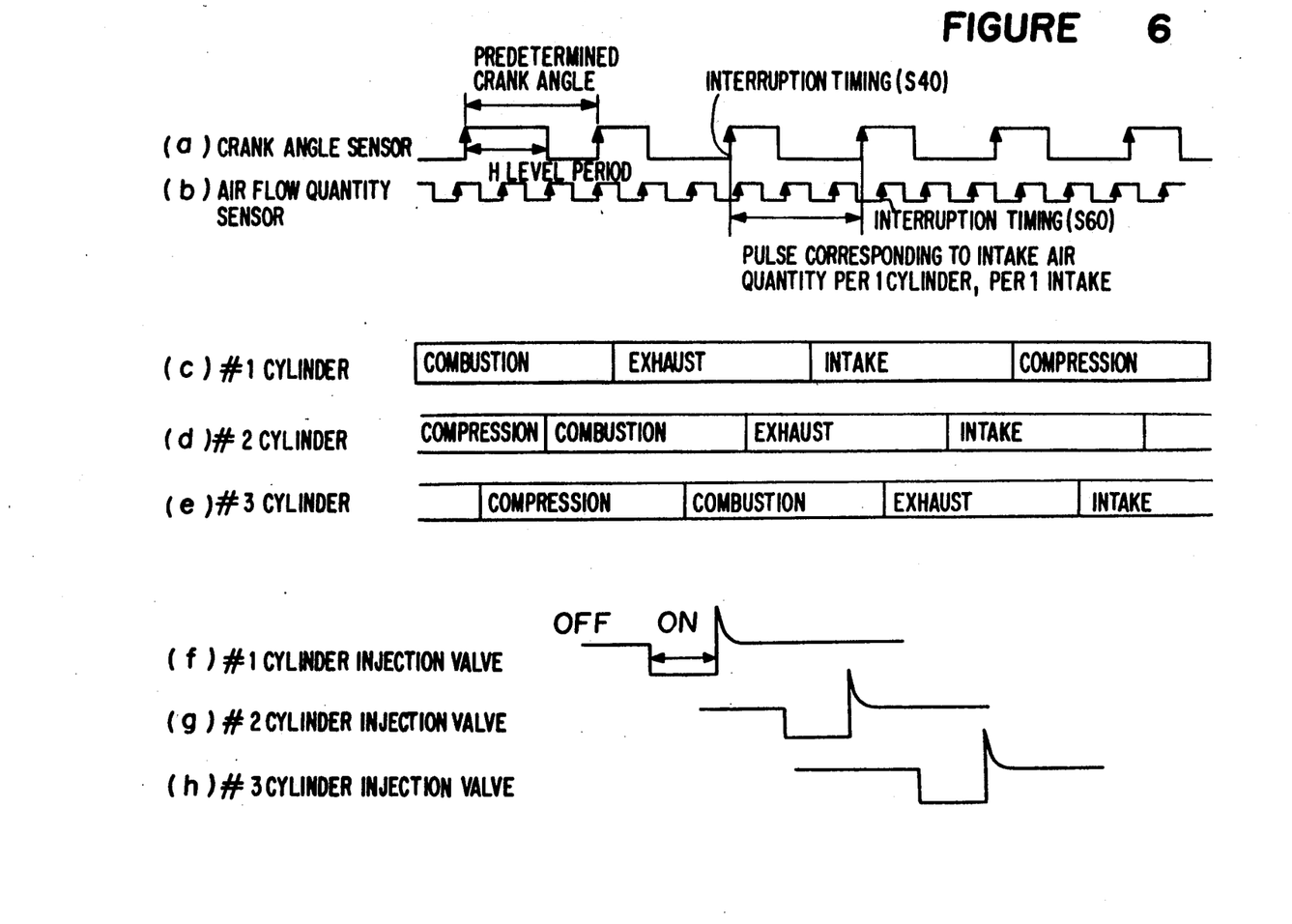
FIG. 6 are timing charts showing fuel injection time according to the present invention.

In step S53, the operation reads a correction quantity for fuel injection which is obtained by the main routine, from RAM 206, and performs correction calculation of the injection quantity (injection time) which determines air flow ratio. In step S54, the operation sets the calculated injection time to the counter 208, opens the fuel injection valves 51 through 56 of cylinders in exhaust stroke as shown in FIG. 6, and supplies the fuel to the engine. In step S55, the operation returns to the main routine.

Figure 5:
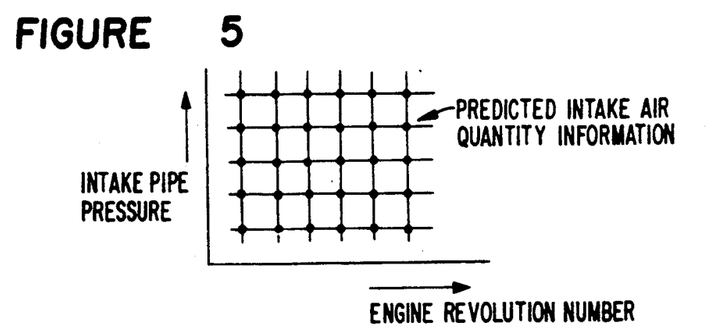
FIG. 5 is a map data for obtaining an assumed intake air quantity by the first embodiment of the present invention.
Figure 7:
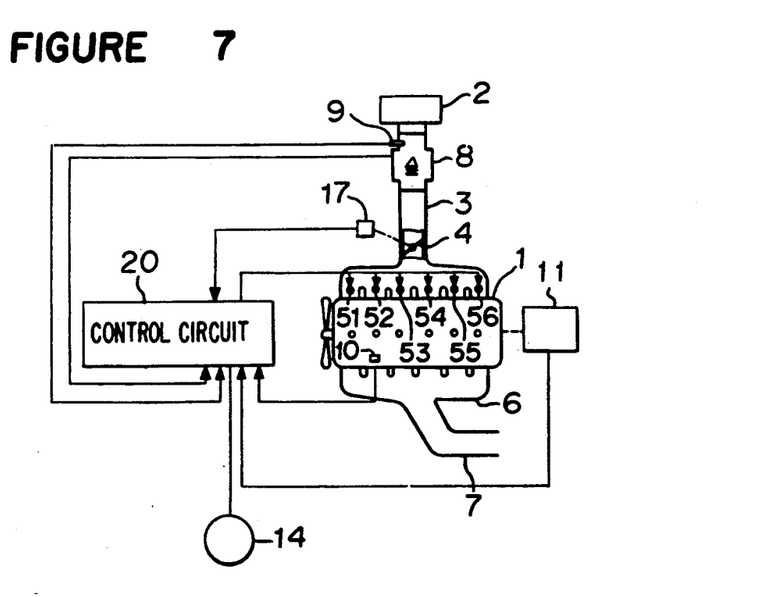
FIG. 7 is a construction diagram showing a second embodiment of the invented device.
Figure 8:
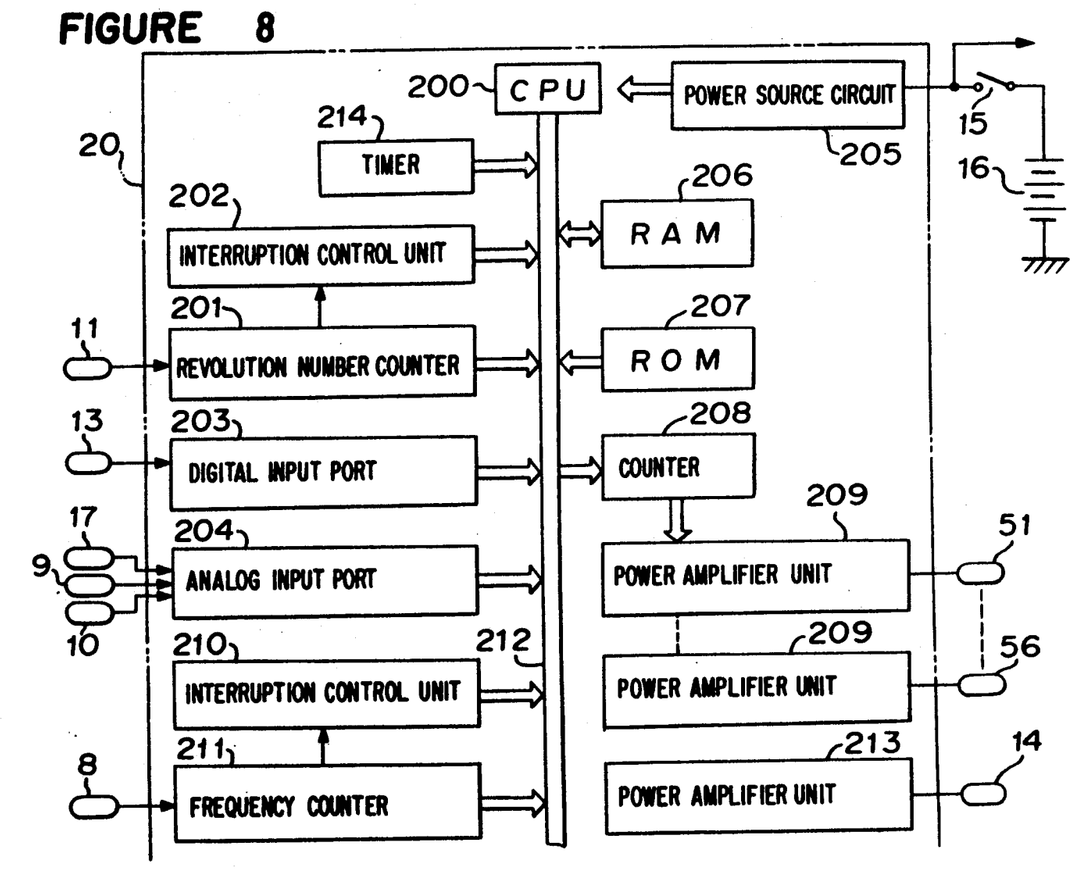
FIG. 8 is a construction diagram of a control circuit in a second embodiment of the present invention.

Furthermore, in the above embodiment, the operation calculates the predicted intake air quantity $Q_I$ from the map shown in FIG. 5 Corresponding with the revolution number and the intake pipe pressure. However, the similar effect can be obtained by calculating the predicted intake air quantity not from the map but from a calculation formula. Furthermore, the operation informs the engine driver of the failure of the air flow quantity sensor 8 by the lamp. However, it may be informed by voice. By this information repair or check can swiftly be performed. FIG. 7 shows structure of a second embodiment of the present invention, wherein instead of the pressure sensor 12 which detects the inner pressure of the intake pipe, a throttle opening degree sensor 17, is provided, which detects an opening degree of the throttle valve 4. FIG. 8 shows a detailed structure of the control circuit 20, wherein an output of the throttle opening degree sensor 17 is inputted to the analogue input port 204.

Figure 9:
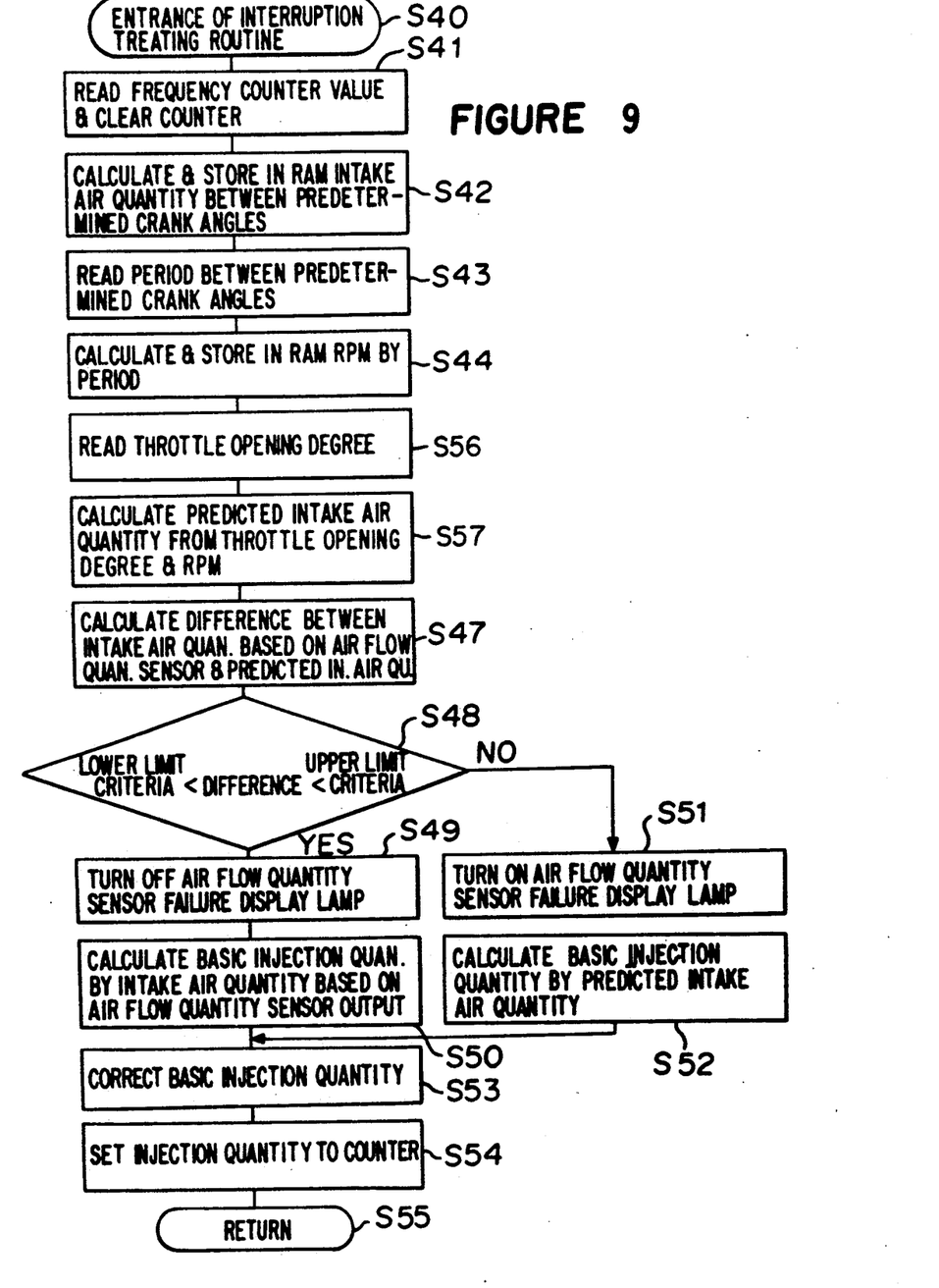
FIG. 9 is a flow chart showing operation of the second embodiment according to the present invention.
Figure 10:
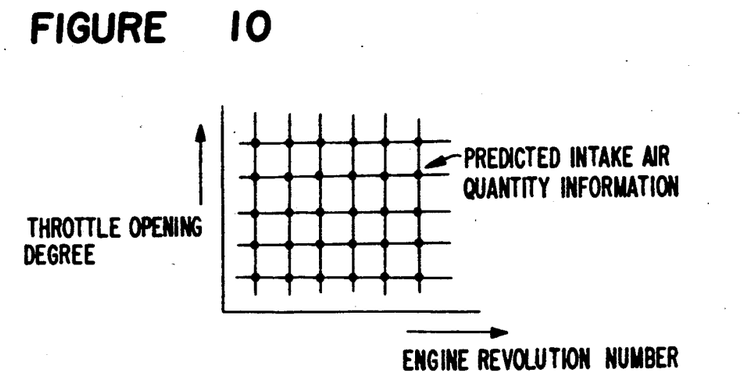
FIG. 10 is a map data for obtaining an assumed intake air quantity by the second embodiment of the present invention.

Next, explanation will be given to the operation of CPU 200 in the second embodiment. The main routine thereof is the same as in FIG. 3A, and FIG. 9 corresponds to the interruption treatment routine shown in FIG. 3B. In step S56, the operation reads digital information corresponding to the throttle opening degree from the analogue input port 204. In step S57, the operation calculates the predicted intake air quantity $Q_I$ corresponding with the revolution number and the throttle opening degree which are obtained in steps S44 and S56, from the map data shown in FIG. 10. In this map data, the intake air quantity information (for instance, measured value) corresponding to the respective revolution number and the respective throttle opening degree, is predetermined and memorized in ROM 207. The other operations are the same as in the first embodiment, wherein the operation of calculating intake air quantity in step S42 is the same as in FIGS. 3C and 4, and the fuel injection timing is the same as in FIG. 6. Furthermore, also in the second embodiment, instead of the map data in FIG. 10, a calculation formula can be used, and the lamp display can be substituted by voice display.

As mentioned above, according to the present invention, the failure of the air flow quantity sensor is detected by comparing the intake air quantity which is predicted from the revolution number of the engine and the intake pipe pressure or the throttle opening degree thereof, with the intake air quantity by the air flow quantity sensor. Accordingly, the failure detection can swiftly and accurately be performed. When the failure is detected, the fuel injection quantity is controlled based on the predicted intake air quantity. Accordingly, error in the air fuel ratio can be reduced, discharge of the injurious exhaust gas or damage of the engine can be prevented. Furthermore, by informing the engine driver the failure of the air flow quantity sensor, repair and check can swiftly be performed.

What is claimed is:

1. A fuel control device for an internal combustion engine, comprising;
   a) an air flow quantity sensor for detecting an intake air flow quantity of the internal combustion engine;
   b) a crank angle sensor for detecting a rotation angle of a crankshaft of the internal combustion engine;
   c) a pressure sensor for detecting a pressure in an intake pipe of the internal combustion engine;
   d) means for continuously and repeatedly determining a predicted intake air quantity for the internal combustion engine based on an engine revolution number obtained from an output of the crank angle sensor and the pressure in the intake pipe;
   e) means for detecting a failure of the air flow quantity sensor by comparing the predicted intake air quantity with the intake air flow quantity obtained from the air flow quantity sensor; and
   f) fuel injection quantity controlling means for controlling a fuel injection quantity to the internal combustion engine based on an output of the air flow quantity sensor when the air flow quantity sensor is normal, and on the predicted intake air quantity when the air flow quantity sensor has failed.

2. A fuel control device for an internal combustion engine, comprising:
   a) an air flow quantity sensor for detecting an intake air flow quantity of the internal combustion engine;
   b) a crank angle sensor for detecting a rotation angle of a crankshaft of the internal combustion engine;
   c) a throttle opening degree sensor for detecting a throttle opening degree of the internal combustion engine;
   d) means for continuously and repeatedly determining a predicted intake air quantity for the internal combustion engine based on an engine revolution number obtained from an output of the crank angle sensor and the throttle opening degree;
   e) means for detecting a failure of the air flow quantity sensor by comparing the predicted intake air quantity with the intake air flow quantity obtained from the air flow quantity sensor; and
   f) fuel injection quantity controlling means for controlling a fuel injection quantity to the internal combustion engine based on an output of the air flow quantity sensor when the air flow quantity sensor is normal, and on the predicted intake air quantity when the air flow quantity sensor has failed.

* * * * *